United States Patent [19]

Russell

[11] 4,144,044

[45] Mar. 13, 1979

[54] METHOD AND APPARATUS FOR FORMING FIBERS

[75] Inventor: Robert G. Russell, Granville, Ohio

[73] Assignee: Owens-Corning Fiberglas Corporation, Toledo, Ohio

[21] Appl. No.: 853,002

[22] Filed: Nov. 18, 1977

[51] Int. Cl.² .................................. C03B 37/02
[52] U.S. Cl. ............................ 65/2; 65/11 W; 65/12; 57/351; 264/167; 264/168
[58] Field of Search ........................ 65/2, 12, 11 W; 57/34 HS; 264/167, 168

[56] References Cited

U.S. PATENT DOCUMENTS

| | | | |
|---|---|---|---|
| 2,783,590 | 3/1957 | Stalego | 65/2 X |
| 2,953,427 | 9/1960 | Egger | 264/167 |
| 2,991,614 | 7/1961 | Ubbelohde | 57/34 |
| 3,063,094 | 11/1962 | Warthen | 65/2 |
| 3,073,136 | 1/1963 | Dean | 65/3 |
| 3,259,479 | 7/1966 | Tiede | 65/3 |
| 3,310,455 | 3/1967 | Warthen | 161/70 |
| 3,420,926 | 1/1969 | Mason et al. | 264/167 |
| 3,495,391 | 2/1970 | Njo | 65/2 X |
| 3,538,206 | 11/1970 | Hann | 264/167 X |
| 3,715,422 | 2/1973 | Chopra et al. | 264/168 |
| 3,912,478 | 10/1975 | Presby | 65/2 |
| 4,050,916 | 9/1977 | Russell | 264/168 X |

FOREIGN PATENT DOCUMENTS 60733 3/1943 Denmark.
4735611 7/1972 Japan.

Primary Examiner—Robert L. Lindsay, Jr.
Attorney, Agent, or Firm—Ronald C. Hudgens; Patrick P. Pacella; Greg Dziegielewski

[57] ABSTRACT

Method and apparatus for forming a twisted or distorted filament are provided by flowing streams of molten material and moving a member located within the stream of molten material at the zone of attenuation sufficient to produce a textured filament.

27 Claims, 13 Drawing Figures

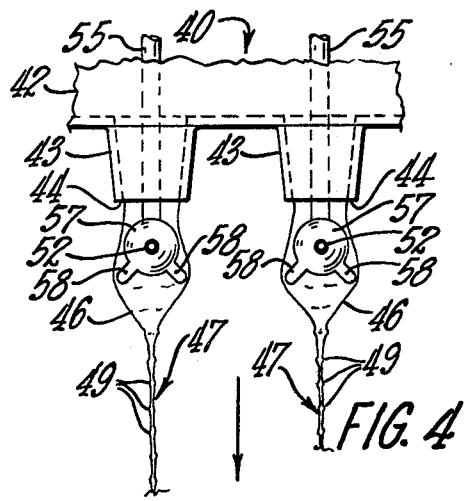
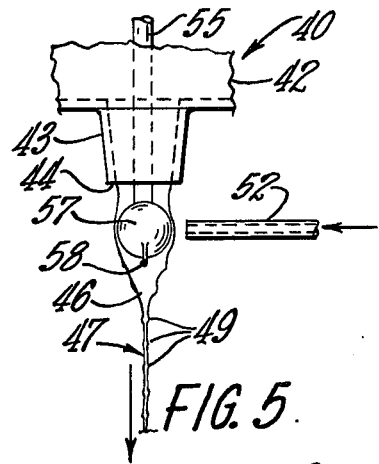
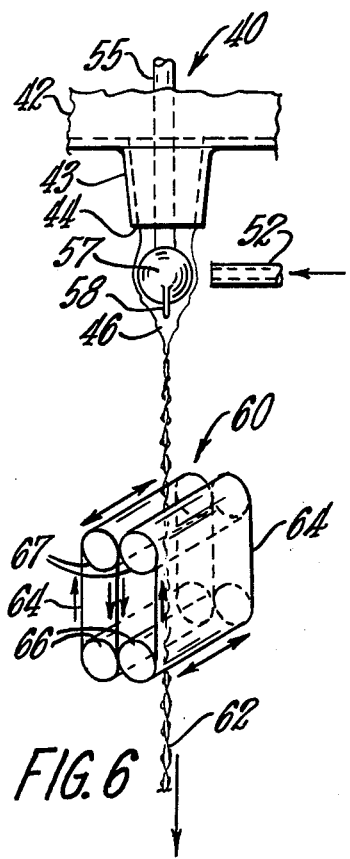
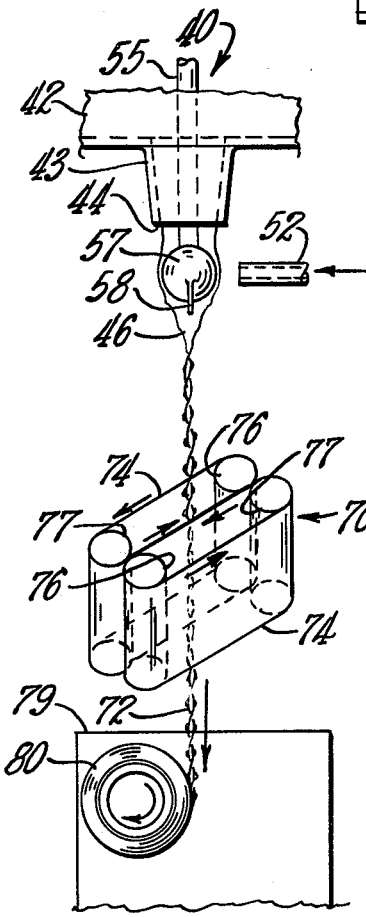
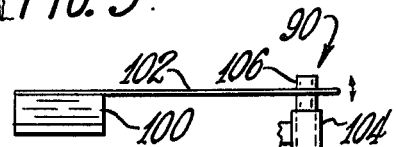
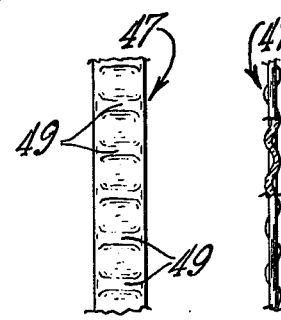

METHOD AND APPARATUS FOR FORMING FIBERS

BACKGROUND OF THE INVENTION

It is well-known that textile fibers can be continuous filaments drawn or attenuated from heat softenable material, such as glass and can be of substantially circular cross sections and have comparatively smooth surfaces. Furthermore, it is known that glass filaments of non-cylindrical shape can be formed by various processes. For example, U.S. Pat. No. 3,310,455 issued to Mr. W. P. Warthen on Mar. 21, 1967 discloses method and apparatus for forming fibers from heat softenable materials wherein the streams of softened material are conditioned to a desired viscosity by contact with a surface and are modified in shape, indented or otherwise distorted at a viscous region of the streams whereby the modified cross sectional shapes of the streams are retained in the solidified filaments attenuated from the streams.

U.S. Pat. No. 3,259,479 issued to Mr. R. L. Tiede on July 5, 1966 discloses a system for making curly composite fibers wherein an individual fiber consists of separate glasses having different co-efficients of expansion in intimate contacting relationship. As such, as the fiber cools to room temperature the differences in co-efficients of expansion of the composite establishes forces which, in the absence of restraint, cause the fiber to curl.

Also, in the organic fiber forming art it is known, among other things, to twist bi-component organic fibers by means of a pair of reciprocably moving endless belts which impart a twist to the filament.

SUMMARY OF THE INVENTION

According to this invention, there is provided method and apparatus for forming filaments having textured or distorted cross sectional shapes by agitating the streams of molten material by a member located within the streams of molten material.

Accordingly, it is a general object of the present invention to provide a fiber forming system wherein the individual filaments have a textured, twisted, or otherwise distorted surface.

It is another object of the invention to provide a system for forming a textured filament wherein the stream of material is agitated from the interior as well as the exterior of the stream of material.

The foregoing, as well as other objects of the present invention, will become apparent to those skilled in the art in the following detailed description.

DESCRIPTION OF THE DRAWINGS

FIG. 4 is an elevational view of a alternate system for inducing the perturbations along the surface of a filament.

FIG. 5 is a side elevational view of the apparatus shown in FIG. 4.

FIG. 6 is an elevational view of a fiber forming position according to the principles of this invention including a system external and spaced from the fiber forming apparatus for imparting twist to the filament.

FIG. 7 is an elevational view of a fiber forming system shown an alternative exterior filament twisting apparatus according to the principles of this invention.

FIG. 8 is a side elevational view of an alternative embodiment for producing a textured or distorted filament according to the principles of this invention.

FIG. 9 is a front view of a filament formed according to the system shown in FIGS. 4 and 5.

FIG. 10 is a side view of the filament shown in FIG. 9.

DESCRIPTION OF THE PREFERRED EMBODIMENTS

This invention embraces method and apparatus for forming filaments or fibers from heat softenable material, such as glass, wherein the streams of softened material are delivered from a feeder conditioned to a desired viscosity and distorted by an internal and/or external means such that the modified cross-sectional shapes of the streams are perpetuated in the solidified filaments being attenuated from the streams.

Figure 1:
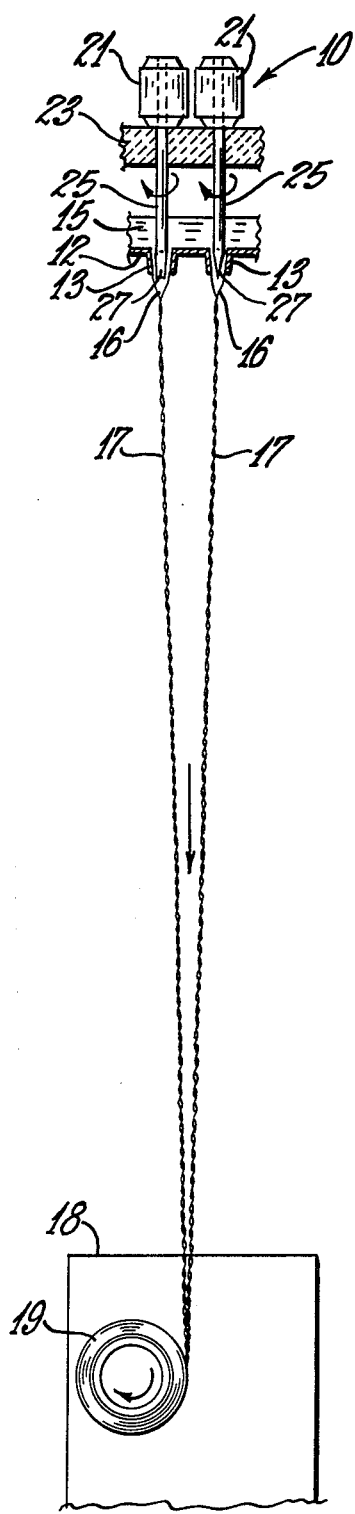
FIG. 1 is an elevational view of a portion of a glass fiber forming position including a winder for attenuating the filaments.
Figure 2:
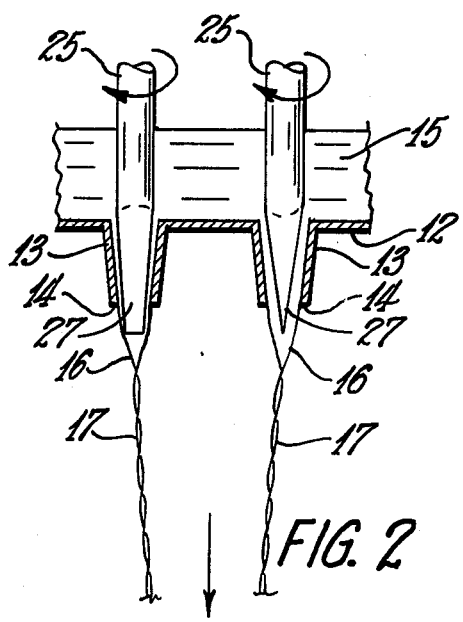
FIG. 2 is an enlarged cross-sectional elevational view of the feeder shown in FIG. 1.

As shown in FIGS. 1 and 2 the fiber forming assembly 10 consists of a feeder 12 having depending tips or projections 13 through which heat softenable material 15 is delivered as streams of molten material 16. From the distal ends 14 of the tips 13 to the solidified portion of the filament extends a region or zone otherwise known as the zone of attenuation of the filaments. The filaments 17 are attenuated by the action of the winder 18 as the filaments are wound into package 19. The winder or means for attenuating the filaments can be of the conventional constant tension type which are commercially available.

To form a textured filament 17 having a twisted geometric shape the fiber forming assembly 10 further consists of motors 21 which are fastened to support means 23, which can be insulated to protect the motors. Rotatable members or shafts 25 are engaged with motors 21 and are adapted to extend through the molten material 15 and feeder 12 to a point beyond or below the distal end 14 of the projections 13.

In operation the molten material 15 flows completely over the portion of rod 25 which extends through projection 13. As the rods are moved or rotated the streams of molten material 16 are also agitated or rotated as they are being attenuated such that the twists or deformations formed in the softened material are retained in the solidified filaments.

As can be more readily seen from FIG. 2 the shafts 25 have a tapered section 27 which generally conforms to the interior of the projection 13 but is spaced therefrom sufficient to allow the molten material 15 to pass between the angular void formed therebetween. The tapered sections, or chisel pointed sections, 27 extend beyond or below the distal end of projection 13 at the zone of attenuation of the streams of molten material. As such the tapered sections 27 are located or positioned within the interior of the streams of molten material.

Figure 3:
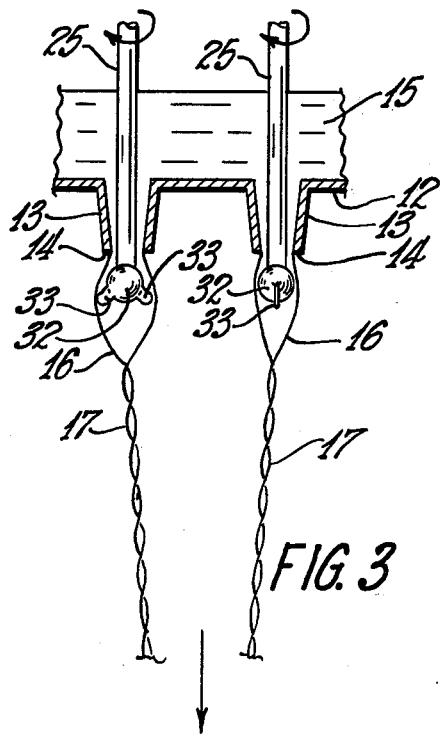
FIG. 3 is a cross-sectional elevational view of an alternative embodiment of the agitating apparatus located at the zone of attenuation of the filaments according to the principles of this invention.

It is believed that with such a system the surface tension of the molten material normally tending to form the material into its lowest energy state (i.e. a sphere) is offset by the centrifugal forces set up within the material due to the rotation of the shafts 25 within the streams at the zone of attenuation. As shown in FIG. 3, the rotatable or movable members are shafts 25 have an arcuate or spherical Section 32 located below the distal end 14 of the projections 13 within the streams of molten material. Each of these spherical sections 32 has a plurality of extending elements or ears 33 to, among other things, magnify the effects of the rotation of the members 25 upon the streams of molten glass 16.

It is to be understood that the relative speed at which the members 25 are rotated or moved with the respect to the speed at which the filaments are attenuated produces a filament having a varying degree of twists per unit of filament length.

As shown in FIGS. 4 and 5 the fiber forming assembly 40 is comprised of a feeder 42 having depending tips or projections 43 through which streams of molten material 46 are moved and eventually attenuated into filaments 47 having waves or perturbations 49. Further, the fiber forming assembly 40 consists of shafts 55 which extend through tips 43 but can be stationary or movable with respect thereto. Each of the shafts 55 have an arcuate or spherical section 57 extending below the distal end 44 of the tips 43. Nozzle 52, which is located adjacent to the stream of molten material 46, is oriented to direct a substantially horizontal stream of fluid, such as air, at spherical section 57. As shown in FIGS. 4 and 5, nozzle 52 is oriented to direct a stream of air at the center of spherical section 57 which lies along the vertical centerline of shaft 55. Ears or extensions 58 are angled obliquely with respect to shafts 55 and extend beyond the lateral extremities of spherical section 57.

In practice the molten glass flows over the surface of the sphere forming a film thereon. The extensions 58 serve to further laterally extend the film of glass in a direction transverse to the direction of the air being supplied through nozzle 52. The streams of molten material can then be attenuated by conventional means. If shafts 55 are held stationary the agitation of the molten stream in conjunction with a cooling rate sufficient to freeze or lock in the perturbations or waves 49 along the lengths of the filaments is believed to result in filaments generally as shown in FIGS. 9 and 10 wherein surface waves or perturbations are retained in the solidified filament.

As shown in FIGS. 6 and 7 the fiber forming assembly 40 is similar to that shown in FIGS. 4 and 5 except that the shafts 55 can be rotated with respect to the tips 43 or they can remain stationary with respect thereto.

In operation the molten material is moved through feeder 42 through tip 43 and over the rod 55 and arcuate section 57. Similarly, nozzle 52 is oriented to direct a coherent stream of fluid, such as air, into contact with molten stream 46.

The textured or distorted filament 62 receives an element of twist by means of twisting mechanism 60 which has a pair of endless belts 64 driven by drive rolls 66 over idler rolls 67. Each of the belts 64 has a surface continuously moving in the direction of advancement of filament 62. However, each of the pulley combinations is adapted to reciprocate in opposite directions along the respective axis of rotation to provide rotation of the solidified filament which is transmitted to the unsolidified portion of the stream of material in the zone of attenuation to produce twisted sections of alternating right and left hand orientation along the length of the filament. Or, shaft 55 can be driven by suitable means (not shown) to rotate at a constant velocity in one direction to produce a twisted filament having alternating twisted sections of right and left hand orientations of differing pitch or twists per inch.

As shown in FIG. 7, the fiber forming assembly 40 is similar to that as shown in FIG. 6, but the twist mechanism 70 is adapted to provide a twist to the solidified filament continuously in one direction if desired. Filaments 72 is attenuated from molten streams 46 by the action of winder 79 with twisting mechanisms 70 imparting a twist to the solidified filaments which is transmitted to the streams 46 in the zone of attenuation to produce a twisted filament.

Nozzle 52 is adapted to impinge the stream of molten material 46 with a stream of fluid to further agitate the stream of material 46 to further modify the texture of resulting filament 72.

The twisting mechanism 70, which is located intermediate the fiber forming assembly 40 and the winder 79, consists of a pair of drive rolls 76 and a pair of idler rolls 77, each having stationary axis of rotation. The endless belts 74 in cooperation with the associated drive rolls 76 and idler rolls 77 have a surface moving in opposite directions with respect to each other which are in contact with the advancing filament sufficient to produce a component of twist which is retained in the solidified filament which are wound into package 80.

As stated above, the shaft 55 can be rotatable or stationary. If rotated a first component of texturization or agitation is induced from within the stream of molten material due to the rotation from the shaft 55 and spherical section 57 and ear 58 within the stream. A second component of texturization or agitation is induced by the impingement of the moving air stream against the stream of molten material 46 while flowing over section 57. A third component of texturization or agitation is induced by the action of the twisting mechanism 70 upon the solidified filament which is transmitted to the unsolidified portion of the unsolidified stream of material. As such, the possible variations, combinations and permutations for producing textured filaments according to the present invention is endless.

As shown in FIG. 8, the fiber forming assembly 90 consists of a feeder 92 for containing a suitable molten material, such as glass, which flows through tip 93 which depends from feeder 92. The molten material issues from the distal end 94 of tip 93 as a stream of molten material 96 flowing over the distal end 108 of reciprocal member 106. Member 106 is reciprocated along its length by means of rod or arm 102 which is operably interconnected with vibratory means 100. Guide 104 serves to locate shaft 106 within the tip 93.

In operation, filaments 97 are attenuated by a suitable means (not shown) as the reciprocating action of the spherical portion 110 and member 106 agitate the stream of molten material 96. The stream is vibrated or agitated sufficient to, in conjunction with a sufficient rate of natural cooling, to retain the textured effect or perturbations induced with the molten material in the solidified filaments 97.

Figure 11:
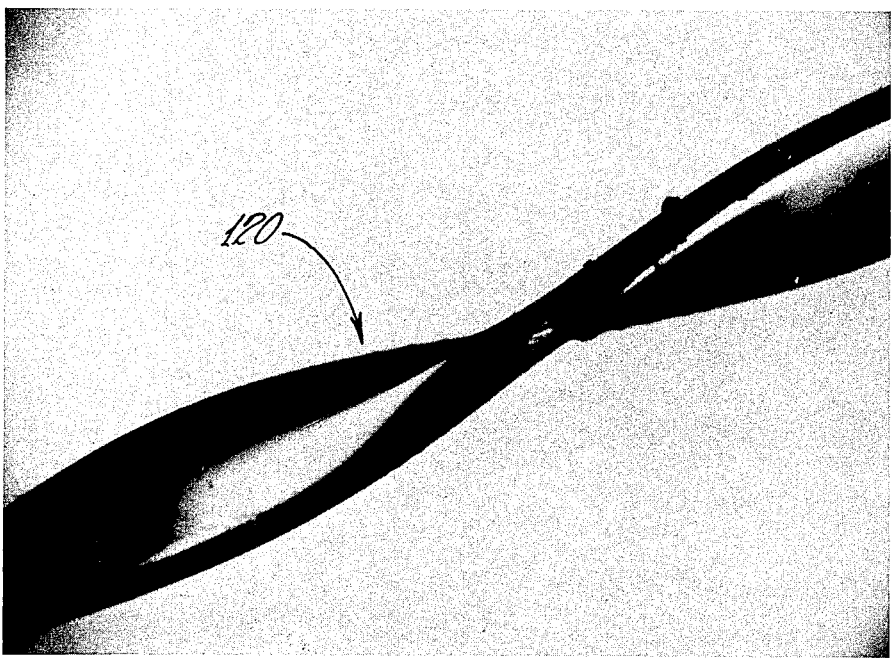
FIG. 11 is a magnified view of a filament formed according to the principles of this invention.
Figure 12:
FIG. 12 is a magnified view of a fiber formed according to the principles of this invention.
Figure 13:
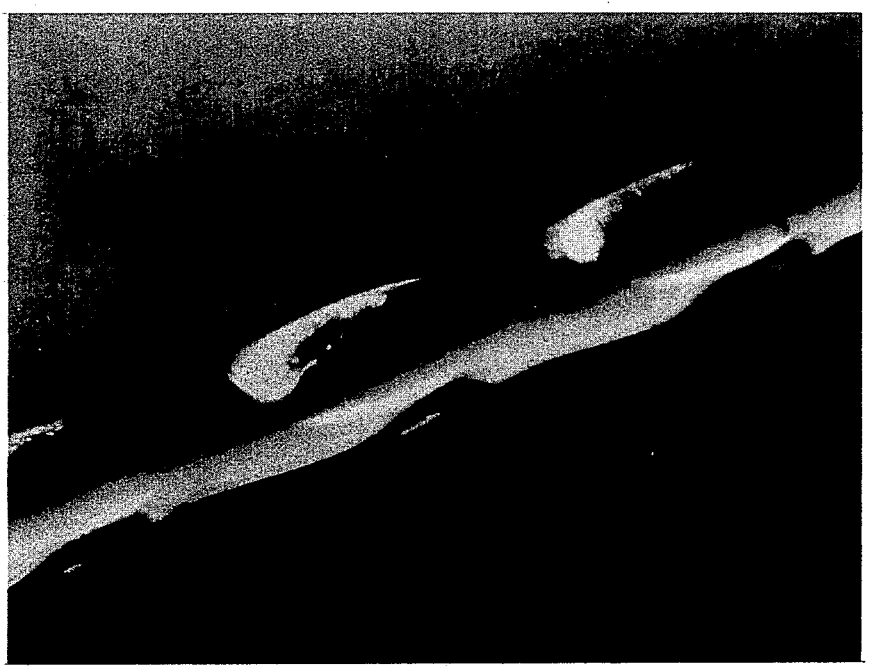
FIG. 13 is a magnified view of a fiber formed according to the principles of this invention.

FIGS. 11 and 12, respectively, show filaments 120, 122 and 124 which can be produced according to the principles of this invention and in particular according to the system depicted in FIGS. 1, 2 and 3. Filaments 120 and 122 are of a flat twisted ribbon type, whereas filament 124 appears to have a generally cylindrical core with a plurality of continuous helical projections extending along the length of the filament 124. The differences in physical characteristics between filaments 120, 122 and 124 can be produced by varying the glass compositions, the molten glass temperature, the rate of attenuation and the amount of agitation induced into the zone of attenuation, and the rate of cooling of the glass in the zone of attenuation It will be appreciated that variations in constructional features, as well substitution of equivalent components and methods, can be undertaken without departing from the spirit and scope of the present invention.

I claim:

1. The method of forming a glass filament comprising: supplying a stream of glass; positioning a movable member at the zone of attenuation within such stream; attenuating the stream to a filament; and moving the member sufficient to texture said filament.

2. The method of claim 1 wherein the member is rotated to form a twisted filament.

3. The method of forming a filament comprising: supplying a stream of heat softenable material; positioning a movable member within such stream at the zone of attenuation; attenuating the stream to a filament; and moving the member sufficient to texture said filament.

4. The method of claim 1 wherein the member is vibrated sufficient to texture said filament.

5. The method of claim 1 further comprising impinging the stream of glass with a stream of fluid in the vicinity of said member sufficient to modify the texture of the filament.

6. The method of claim 1 wherein the member is reciprocated lengthwise within the stream sufficient to texture said filament.

7. The method of claim 6 further comprising impinging the stream of glass with a stream of fluid in the vicinity of the member sufficient to enhance the texture of the filament.

8. The method of claim 1 further comprising contacting the filament with a moving surface sufficient to further modify the texture of the filament.

9. The method of claim 8 wherein said member is rotated to form a twisted filament and said surface is moving in a direction transverse to the direction of filament advancement.

10. The method of claim 8 further comprising impinging the stream of glass with a stream of fluid in the vicinity of the movable member.

11. Apparatus for forming a filament comprising: means for supplying a stream of heat softenable material;
   a movable member positioned within the stream of material at the zone of attenuation;
   means for moving said member sufficient to impart a textured effect to the subsequently formed filament; and
   means for attenuating the stream into said filament having a textured surface.

12. The apparatus of claim 11 wherein the member is rotatable to form a twisted filament.

13. The apparatus of claim 12 further comprising a means for impinging the stream of material with a stream of fluid.

14. The apparatus of claim 11 wherein the member has a beveled section located in the stream of material at the zone of attenuation of the filament.

15. The apparatus of claim 11 wherein the member has a spherical section within the stream of material at the zone of attenuation of the filament.

16. The apparatus of claim 15 wherein the spherical section has at least one ear protruding from the spherical section.

17. The apparatus of claim 11 wherein the member is sufficiently vibratable to produce a textured filament.

18. The apparatus of claim 17 further comprising a means for impinging the stream of material at the zone of attenuation with a stream of fluid sufficient to modify the texture of the filament.

19. The apparatus of claim 11 wherein the member is reciprocable along the length thereof sufficient to produce a textured filament.

20. The apparatus of claim 19 further comprising a means for impinging the stream of material at the zone of attenuation with a stream of fluid sufficient to modify the texture of the filament.

21. The apparatus of claim 11 further comprising a means for imparting twist to the filament to modify the texture of the filament, the means for imparting twist being spaced from the means for supplying the streams of heat the softenable material.

22. The apparatus of claim 21 wherein the means for imparting twist has at least one surface adapted to be placed in contact with the filament, said surface being movable in a direction substantially transverse to the direction of filament advancement.

23. Apparatus for forming glass filament comprising: means for supplying a stream of heat softened glass;
   a movable member positioned within the stream of glass;
   means for moving said member sufficient to impart a textured effect to the subsequently formed filament; and
   means for attenuating the stream into said filament having a textured surface.

24. The apparatus of claim 23 wherein said movable member projects from said means for supplying said stream of glass.

25. The apparatus of claim 23 wherein said movable member is positioned within the stream of glass at the zone of attenuation.

26. The method of claim 3 wherein the member is positioned to project from a means for supplying said stream of material.

27. The method of claim 26 further comprising impinging the stream of material in the vicinity of the movable member with a stream of fluid.

* * * * *